United States Patent [15] 3,657,482

Dal Monte [45] Apr. 18, 1972

[54] CENTRALIZED IDENTIFICATION AND DEBITING SYSTEM FOR TELEPHONE SUBSCRIBERS

[72] Inventor: Giorgio Dal Monte, Milan, Italy

[73] Assignee: Societa Italiana Telecomunicazione Siemens SpA, Milan, Italy

[22] Filed: Apr. 14, 1971

[21] Appl. No.: 133,816

Related U.S. Application Data

[63] Continuation-in-part of Ser. No. 728,200, May 10, 1968, Pat. No. 3,591,723.

[52] U.S. Cl. ....................179/7 MM
[51] Int. Cl. ....................H04m 15/18
[58] Field of Search................179/7 R, 7 MM, 7.1 R, 7.1 TP

[56] References Cited

UNITED STATES PATENTS 3,591,723 12/1964 Burke ....................179/7 MM

*Primary Examiner*—Kathleen H. Claffy
*Assistant Examiner*—Tom D'Amico
*Attorney*—Karl F. Ross

[57] ABSTRACT

A central memory in a telephone exchange contains, in storage sections assigned to individual subscribers, binary words representing the current balances of their respective accounts together with possible classification information. An input multiple, whose leads are selectively energizable by a line finder in the presence of an incoming call, address the storage section assigned to the calling subscriber and, in the case of the subscribers within a predetermined class, concurrently transmits an identification of this subscriber to a code register via a buffer register under the control of a classification unit. The input multiple also receives, in the case of a toll call, counting pulses from a called subscriber to indicate the amount of the toll to be debited to the calling subscriber, each containing pulse causing the contents of the addressed storage section to be read out and promptly reinscribed after augmentation by one unit; read-out or augmentation in inhibited whenever the energization of the input multiple is due to an interrogation pulse occurring upon seizure of the register. A retrieval unit associated with the memory controls the classification unit and can also be operated, with inhibition of augmentation, for auditing and reclassification purposes.

10 Claims, 2 Drawing Figures

Patented April 18, 1972

3,657,482

2 Sheets-Sheet 2

Figure 1:
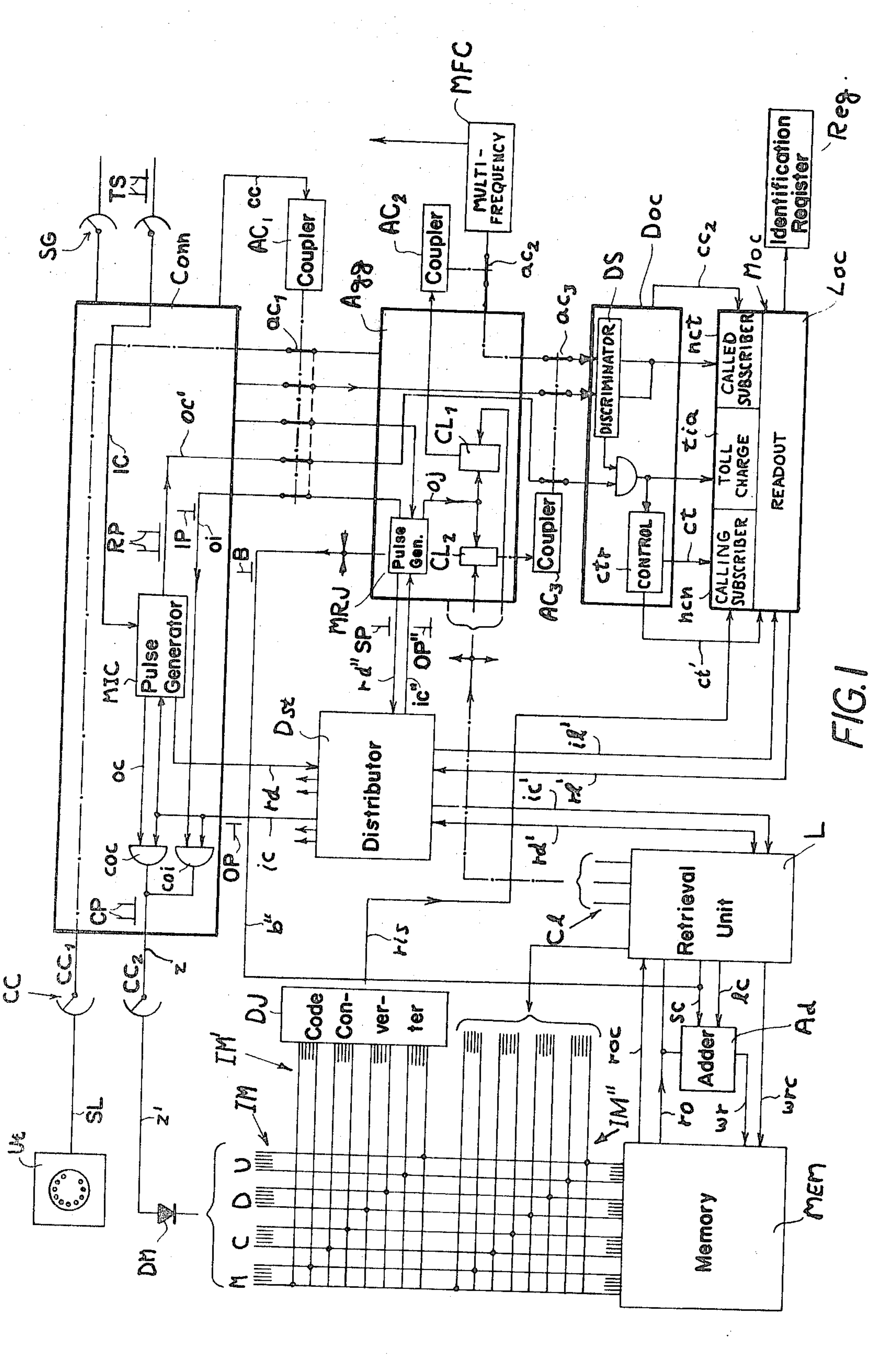

Giorgio Dal Monte
INVENTOR.

BY

Karl G. Ross

Attorney

CENTRALIZED IDENTIFICATION AND DEBITING SYSTEM FOR TELEPHONE SUBSCRIBERS

This application is a continuation-in-part of my copending and commonly owned application Ser. No. 728,200 filed 10 May 1968, now U.S. Pat. No. 3,591,723.

My present invention relates to a communication system, such as a telephone, telegraph or teletype network, wherein lines from a multiplicity of subscribers are connected to a central office or exchange for the selective establishment of toll-call connections therebetween. The term "toll call," as herein used, refers to any communication for which the account of the calling subscriber is debited with one or more units of charge; in many instances this involves only long-distance calls, as distinct from free calls to the business office and local calls whose cost may be included in the basic monthly subscription rate.

In conventional telecommunication systems of this nature it is customary to provide an individual rate counter at the central-office terminus of each subscriber line, the counter being stepped by rate pulses over an established connection in the event of a toll call originated at that line. If local calls are subject to a unit charge, the counter receives a single rate pulse upon the establishment of a connection of this type; on long-distance calls the rate pulses follow one another with a frequency depending on distance.

It is known to provide, in such a system, a memory with a multiplicity of storage sections each assigned to a respective subscriber to store an amount representing the current balance in that subscriber's account, each storage section being individually addressable by a code signal assigned to the corresponding subscriber and fed to the memory input by the central-office equipment upon the initiation of a call over a local line. A storage section thus addressed delivers the stored amount to a read-out circuit whence it is normally transferred to a writing circuit for immediate reinscription after being augmented by one unit in an arithmetic device hereinafter referred to as an adder. The subscriber's code signal is generated whenever a connector circuit (line finder and selector) is seized by a calling subscriber line and also, thereafter, in response to each rate pulse received over the called line; thus, the adder must inhibited during the initial generation of the code signal in response to an interrogation pulse distinct from the subsequently arriving rate pulses.

It is frequently desirable, at least in the case of certain subscribers, to establish a separate record of all toll calls with identification of the calling and, advantageously, also the called subscribers as well as the charges involved. The general object of my present invention is to provide means for recording this information for subscribers of a predetermined classification on a register without encumbering same with data pertaining to other subscribers or to abortive calls.

Another object of this invention is to provide simple means for altering the classification of a subscriber for purposes of registration or nonregistration of toll calls.

According to the present invention, a computer including the aforedescribed memory also comprises a retrieval unit which determines the classification of a subscriber identified by a code signal, in response to an interrogation pulse, and — if the classification is of the proper type — actuates a normally inoperative coupler to seize a recording unit; the latter, however, responds only to subsequent code signals, due to arriving rate pulses, to register the identity of the calling subscriber along with these rate pulses, no such registration occurring if the call is not completed or is not chargeable to the calling subscriber's account. The recording unit may be under the further control of a discriminator which determines whether the party selected by the calling subscriber is indeed to be reached through a toll connection; otherwise, no record is made of the call.

Advantageously, the recording unit includes a buffer register which temporarily stores the identity of the calling subscriber and transfers it, together with the other data, to the main register only if the call is conummated, leaving no permanent record in the event of nonconsummation.

The various subscriber classifications may include, for example, subscribers with pushbutton selectors requiring the intervention of special equipment (e.g. a multiple-frequency generator) to establish a connection; official stations not subject to toll charges; or special users (e.g. coin-operated pay stations) which do not require a periodic statement of account. This classification information can be retrieved, pursuant to a further feature of my invention, from the memory in response to the interrogation pulse generated upon the initiation of a call, with or without concurrent identification of the calling subscriber.

In order that the addressing of the memory may proceed in a regulated manner and with optimum utilization of available circuitry, I prefer to make use of a pulse distributor which emits the aforedescribed interrogation and counting pulses in response to start and rate pulses from the connector but in a proper time sequence to rule out overlapping seizures by different callers. The same distributor may be called upon to provide an auditing pulse for the reading of an account in the absence of a call from the respective subscriber, with immediate reinscription of the unaltered balance or with inhibition or reinscription to reset the corresponding memory section at the beginning of a new accounting period. A suitable distributor of this kind has been disclosed in U.S. Pat. No. 3,551,888. Such a distributor comprises an orthogonal matrix of coincidence gates under the control of respective row and column switches which respond in a predetermined sequence to identification signals from corresponding rows and columns of an orthogonal array of as many selector units as there are coincidence gates in the distributor matrix.

Figure 2:
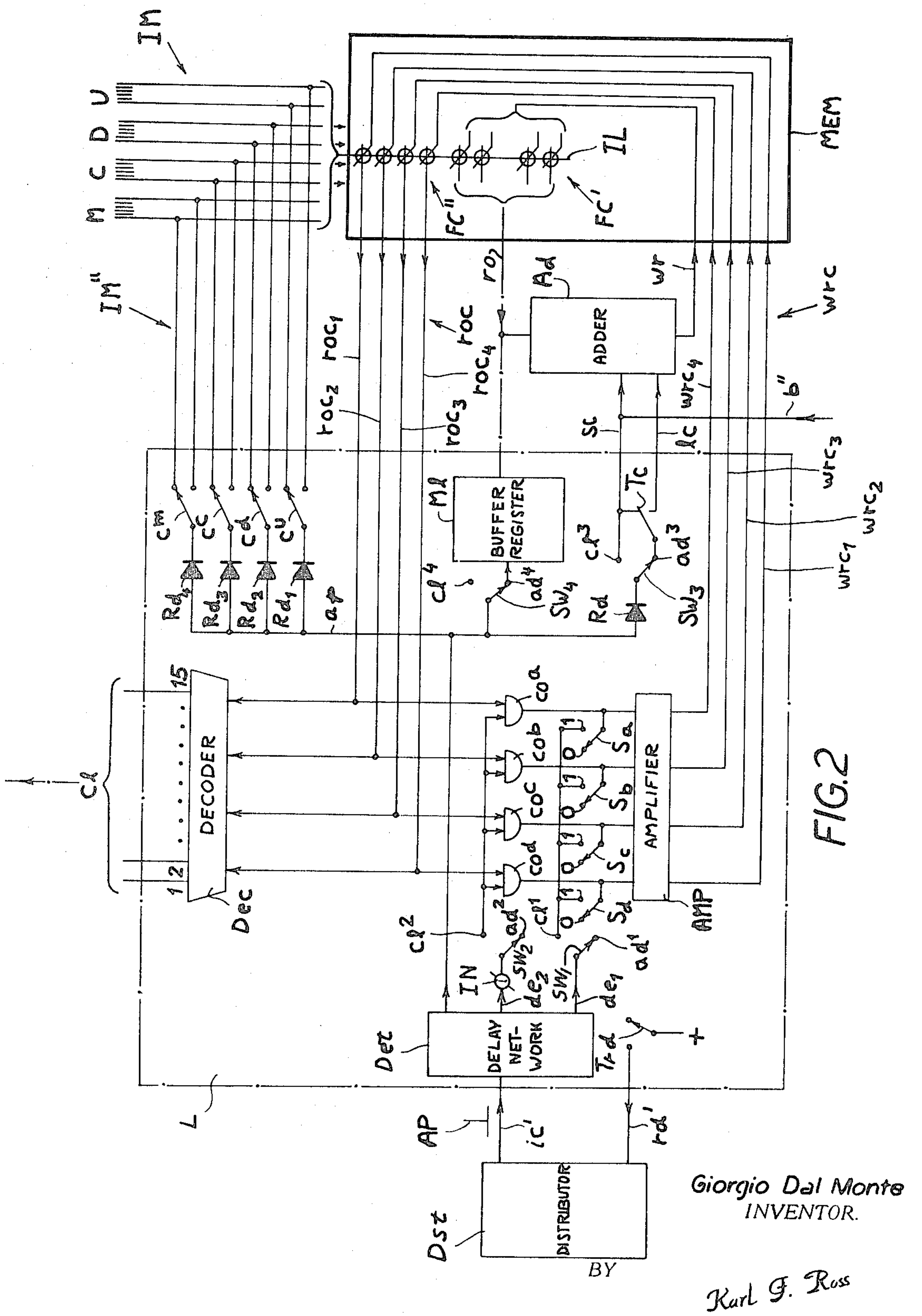

The above and other features of my invention will become more fully apparent from the following detailed description given with reference to the accompanying drawing in which:

FIG. 1 is a circuit diagram of a communication system embodying the invention; and FIG. 2 is a more detailed diagram of several components of the system of FIG. 1.

Reference will first be made to FIG. 1 which shows the equipment of a telephone exchange associated with a multiplicity of subscriber lines, one such line having been indicated at SL and terminating at a dial-equipped telephone set U*t*.

The central-office equipment of the exchange includes a conventional line finder CC shown as a multilevel switch, only two levels $CC_1$ and $CC_2$ having been illustrated.

A similar multilevel switch forms a conventional selector SG designed to extend an incoming call to an outgoing truck or subscriber line. A conductor IC, connected to a level of this selector, receives a toll signal TS which generally consists of one or more pulses whose cadence determines the toll charge per unit of time. Conductor IC terminates at a unit MIC which retransmits the pulses TS or otherwise responds to the toll signal to generate a train of rate pulses RP on a conductor *rd* leading to a distributor D*st*; another output lead *oc* of pulse generator MIC carries, during transmission of pulses RP, a biasing potential applied to one input of an AND gate *coc* whose other input is connected to an output lead *ic* of distributor D*st*. AND gate *coc* has an output lead *z* which terminates at the line-finder level $CC_2$ and, in response to an incoming call from line SL, is extended by way of that level to a wire *z'* thereof.

Another pulse generator MRJ, similar to unit MIC, has an output lead *oi* connected to one input of an AND gate C*oi* whose other input is also connected to distributor lead *ic*; the output lead of gate *coi* joins the lead *z* from gate *coc* via a direct junction or an OR gate not shown. Distributor D*st* is further connected via leads *ic*, *ic''* to units MRJ amd MIC for the purpose of controlling their operation and ultimately restoring them to cancel the gate-opening bias on their respective output leads *oi* and *oc*.

An identification register R*eg* is one of several such registers available for seizure, upon the initiation of a call from one of the associated subscribers, in response to a signal on a lead *cc* from a nonillustrated line-finder level which operates a coupler $AC_1$; the latter then extends the connector equipment between line finder CC and selector SG, represented by a block Conn, to a classification selector Agg and a registration-control unit Doc. Conventional circuitry, not further illustrated, is used to allow only one such register to be seized by the calling subscriber line and to cause thereupon the transmission of a dial tone to the subscriber. Distributor Dst is shown provided with additional input and output leads, corresponding to leads rd and ic, which extend to other combinations of pulse generators MIC and MRJ associated with other registers similar to unit Reg.

Wire z' is connected, through a diode matrix diagrammatically indicated at DM, to an input multiple IM designed to identify a maximum of 9999 subscribers by the selective energization of four groups of 10 code conductors each, i.e. conductors U (units), D (tens), C (hundreds) and M (thousands). These conductors form the input of a memory MEM consisting, for example, of a multilevel ferrite-core array. The ferrite cores are threaded by these conductors in a pattern which divides the array into as many sections as there are subscribers, each section containing enough cores to store a binary word with a number of bits (e.g. 17) sufficient to register the current balance of any subscriber's account during an accounting period (e.g. 1 month). Multiple IM is also connected, via a group of similar conductors IM', to the input of a code translator DJ which converts the decimal code of the subscriber identification into a binary pulse train transmitted via a lead ris and a buffer register Moc to the register Reg and all similar registers in parallel therewith.

Memory MEM has a read-out circuit ro and a writing circuit wr interconnected by an adder Ad adapted, in a manner known per se, to increase the numerical amount fed in over circuit ro by a unit value before delivering this augmented amount to the circuit wr for reinscription in the storage section from which it was extracted. It will be understood that circuits ro and wr may each consist of a plurality of conductors threaded through corresponding cores of all the storage sections of memory MEM.

A retrieval unit L has an input connected to circuit ro and output lines sc, lc leading to adder Ad; other connections ic' and rd' extent between this unit L and the distributor Dst.

The construction of retrieval unit L will be described in greater detail hereinafter with reference to FIG. 2.

The buffer register Moc includes a read-out unit Loc which, together with the associated registration unit Reg, forms part of a recording stage of the exchange. Unit Reg may comprise a tape perforator, a magnetic-tape recorder of any other conventional device for making a permanent record of a toll call for accounting purposes. It shall be assumed that the record to be made consists of three parts, i.e. the identify of the calling subscriber, the manner of toll units to be charged, and the identity of the called subscriber. These three parts are represented by corresponding subdivisions ncn, tia and nct of buffer register Moc.

Unit Agg is designed to discriminate between different classes of subscribers which may or may not require the establishment of a permanent record through the intervention of a register Reg. It will be assumed that a maximum of 15 classifications are to be identified with the aid of four additional bits stored in corresponding sections of memory MEM, these bits being read out by a circuit roc and reinscribed by a circuit wrc in a feedback connection which bypasses the adder Ad. The feedback loop extends through the retrieval unit L which delivers the classification information to a wire multiple Cl terminating at unit Agg, the latter including a plurality of response devices such as relays $CL_1$ and $CL_2$ (only two shown).

As more specifically illustrated in FIG. 2, the circuit roc includes four read-out wires $roc_1$, $roc_2$, $roc_3$ and $roc_4$ extending to a decoder Dec which converts the four-bit word portion carried on these wires into a voltage on one of 15 conductors forming part of the multiple Cl. If a call originates with an unclassified subscriber, none of these conductors will be energized unless one combination of bits (other than 0000) is specifically assigned to all unclassified subscribers, the maximum number of distinct classes being reduced in this case to 14. It is, of course, also possible to provide an additional read-out wire which is invariably energized upon the addressing of a memory section for the transmission of a definite output signal from decoder Dec which positively indicates the classification read out to unit Agg whereby also the combination 0000 can be made significant.

The block Conn includes, apart from conventional circuitry, the pulse generator MIC and the coincidence gates coc and coi described above. The other pulse generator MRJ is located within classification unit Agg and has a further output lead oi extending to the relays $CL_1$ and $CL_2$ to condition them for energization by one of the conductors of multiple Cl during the preliminary stage immediately following the initiation of a call by sub-scriber Ut. This operation results in the seizure of an available classification unit Agg through the coupler $AC_1$ having contacts $ac_1$; pulse generator MRJ, linked with distributor Dst via wires rd'' and ic'', is also connected, in parallel with similar pulse generators in other classification units, to a blocking lead b'' extending through the connection sc to the adder Ad of the computer.

The two classification relays $CL_1$ and $CL_2$ are seen, by way of example, to control respective couplers $AC_2$ and $AC_3$ having contacts $ac_2$ and $ac_3$; these relays may be operated, according to subscriber classification, individually, jointly or not at all. Contacts $ac_2$ are shown to extend to a multiple-frequency generator MFC which, in response to destination-indicating voltages from a subscriber equipped with a pushbutton selector in lieu of a dial, identifies a called subscriber by a succession of signals of distinct frequencies which actuate a local line selector or are transmitted over an outgoing trunk (via selector SG) to a distant exchange. Coupler $AC_3$ seizes an available registration-control unit Doc which is connected to the buffer register Moc and reader Loc working into the register Reg. Each unit Doc contains a controller ctr which responds to the first rate pulse RP on an output lead oc' of unit MIC to condition the subregister ncn, through a connection ct, for reception of the calling-subscriber identification transmitted by decoder DJ via lead ris. Controller ctr also has an output lead ct' connected to reader Loc for initiating a transfer of the contents of the relevant section of buffer register Moc to the permanent register Reg upon termination of the call. The rate pulses RP are entered in subregister tia directly from lead oc'.

Unit Doc further contains a discriminator DS which determines the nature of the connection sought to be established by the calling subscriber, i.e. whether it is a long-distance call or a local one. If, as is usually the case, a permanent record is to be made only for long-distance calls, the discriminator allows the passage of dial and rate pulses to register Moc only if the number of the called subscriber is preceded by an area code having a characteristic portion reserved for long-distance calls. In some countries this characteristic portion is the digit "0" in the first position; in the United States, generally, long-distance calls are characterized by a "0" or a "1" in second place. Thus, the discriminator Ds may include means for temporarily storing either the first digit or the first two digits which, upon verification, are then retransmitted along with subsequent digits to the subregister nct.

The initiation of a call by the subscriber Ut causes operation of coupler $AC_1$ with actuation of pulse generator MRJ which transmits a start pulse SP to distributor Dst through lead rd'' and, in response to an output pulse OP'' on lead ic'', sends an interrogation pulse IP to line wire z by way of lead oi and gate coi which is concurrently unblocked by a pulse OP on distributor lead ic, a blocking pulse B appearing simultaneously on output lead b'' of generator MRJ. The selective energization of the wires of multiple IM feeds a code signal to translator DJ, yet the resulting pulse train on lead ris is ineffectual since no section of subregister ncn is enabled at this time. Simultaneously, memory MEM responds and actuates the retrieval unit L whose multiple Cl supplies the classification information to the ancillary unit Agg which contains the actuated pulse generator MRJ. If this classification information does not result in the operation of relay $CL_2$, the recorder Doc, Moc, Loc, Reg does not intervene; the contents of the memory section assigned to the calling subscriber will, however, be altered, as described below, in the case of a toll call.

If the classification relay $CL_2$ operates, coupler $AC_3$ goes into action and seizes a unit Doc. The dial pulses or other (e.g. pushbutton-generated) destination signals from the calling subscriber are now transmitted to discriminator DS and through it, in the case of a long-distance call, to the section of subregister *nct* assigned to the engaged control unit Doc. In the case of an abortive call, reader Loc does not operate and the entry in subregister *nct* is erased through a cancellation circuit $cc_2$ upon rupture of the connection between the calling subscriber and the equipment Conn.

If the called party responds, a single pulse TS (in the event of a local call) or a train of such pulses (in the case of a long-distance connection) arrives over conductor IC and gives rise to an equal number of rate pulses RP on leads *oc'* and *rd*. Each rate pulse evokes from the distributor, on lead *ic*, an output pulse OP clearing the coincidence gate *coc* which at this point is unblocked by a suitable biasing voltage on lead *oc*, gate *coi* remaining blocked. Gate *coc* thus passes a counting pulse CP for each applied output pulse OP, the pulses CP traveling over leads *z*, *z'* and diode matrix DM to input multiple IM in the same manner as did the interrogation pulse IP. Since, however, blocking lead *b''* is not energized at this time, the occurrence of a word stored in the memory section addressed by the multiple IM to be read out at circuits *ro* and *roc*; the amount of the balance of the subscriber's account is augmented in adder Ad, and the information extracted from the memory MEM is reinscribed via circuits *wr* and *wrc*. The pattern of energization of multiple IM is communicated, through multiple IM', to code translator DJ to deliver a subscriber-identification pulse train to the subregister *ncn* which is now enabled by a concurrent pulse from controller *ctr*. At this point, therefore, the engaged section of buffer register Moc contains the identity of the calling subscriber at *ncn*, the identity of the called subscriber at *nct* and a count of one toll unit at *tia*. While the communication between the two subscribers is maintained, further rate pulses RP may be generated to increase the amount entered in subregister *tia*.

Pulse generator MRJ is restored to normal prior to the inception of dialing; operated relay $CL_2$, however, does not release as long as the ancillary unit Agg is held busy by the coupler $AC_1$, i.e. until the call is terminated. Coupler $AC_3$ is then also deactivated to release the control unit Doc. This release triggers a signal on output lead *ct'* of controller *ctr* which stimulates the reader Loc to request, via a lead *rl'*, the intervention of distributor Dst which thereafter emits a reading pulse on a lead rl' to authorize the transfer of the contents of this particular section of register Moc to unit Reg at the proper instant.

In this manner, owing to the presence of distributor Dst, several calls can be monitored simultaneously with suitable interleaving of the timing pulses which cause the various registration and transfer operations described above.

The same distributor may also be called into play to permit the auditing of the account of any subscriber and a changing of a subscriber's classification as will now be described with reference to FIG. 2. In that Figure, the memory MEM is shown to include a first group of ferrite cores FC' with read-out connections to circuit *ro* and a second group of such ferrite cores FC'' with read-out connections to circuit *roc*, the two groups together forming a storage section served by a specific combination of input leads from multiple IM as indicated diagrammatically at IL. Circuit *ro*, itself a wire multiple, is connected to the input of adder Ad and in parallel therewith to a buffer register Ml which may be connected, in a manner not further illustrated, to any conventional display device enabling the visual ascertainment of its contents. A conductor multiple IM'', similar to multiple IM' and also shown in FIG. 1, connects the conductors of groups U, D, C and M of multiple IM to respective bank contacts of four switches $c^u$, $c^d$, $c^c$ and $c^m$ in retrieval unit L which are separately settable, manually or otherwise (e.g. by remote control), to establish a desired pattern of energization of multiple IM upon the application of an auditing pulse AP from output lead *ic'* to a wire *ap* connected to these switches in parallel through respective rectifiers $Rd_1$, $Rd_2$, $Rd_3$and $Rd_4$. The auditing pulse AP, reaching the wire *ap* through a delay network Det, is called forth from distributors Dst by a command signal applied to lead *rd'* by way of a circuit closer shown here diagrammatically as a key Trd; this key may again be operated locally or by remote control. Switches $c^u$, $c^d$, $c^c$ and $c^m$ could also be part of an automatic sequencer which, upon closure of contacts Trd, progressively steps these switches through all possible combinations so as to sample every storage section of memory MEM; the sequencer may be advanced by conventional means responsive to the trailing edge of an auditing pulse AP.

A selector switch in retrieval unit L has four ganged armatures $SW_1$, $SW_2$, $SW_3$ and $SW_4$ alternately engageable with respective bank contacts $ad^1$, $ad^2$, $ad^3$, $ad^4$ or $cl^1$, $cl^2$, $cl^3$, $cl^4$. In its first ("auditing") position, this switch open-circuits two further outputs $de_1$, $de_2$ of delay network Det, connects wire *ap* through a rectifier Rd to a switchover contact Tc, and further connects this wire to an enabling input of buffer register Ml; switchover contact Tc extends this connection to either of the two control leads *sc*, *lc* of adder Ad. In the alternate ("classification") position of this selector switch, armature $SW_1$ connects output $de_1$ in parallel to the No. 1 bank contacts of four additional switches $S_a$, $S_b$, $S_c$ and $S_d$ which are connected through a group of direct-current AMP to respective leads $wrc_1$, $wrc_2$, $wrc_3$, $wrc_4$ of the supplemental writing circuit *wrc*, the inputs of these amplifiers being also energizable from corresponding leads of the supplemental read-out circuit *roc* via respective AND gates $co^a$, $co^b$, $co^c$ and $co^d$ whose other inputs are then connected by armature $SW_2$ to output $de_2$ which includes an inverter IN; at the same time the lead *ap* is connected via armature $SW_3$ to wire *sc* and is disconnected from buffer register Ml at armature $SW_4$.

When the intervention of distributor Dst is solicited by the reversal of key Trd, it emits one or more auditing pulses AP (depending upon the duration of such reversal) between output pulses OP (FIG. 1) so that the operation of the retrieval unit L should not interfere with the identification and toll-registration operations previously described. Delay network Det causes a lengthened replica of each pulse AP to appear in its output $de_2$ so that, owing to the presence of inverter IN, the coincidence gates $co^a$— $co^d$ are blocked if switch armature $SW_2$ is on its "classification" contact $cl^2$. In that instance, the delayed appearance of pulse AP in output $de_1$ causes the reinscription of a new classification in the cores FC'' of the addressed memory section, according to the setting of switches $S_a$ — $S_d$ which may also be actuated by an operator either directly or from a remote location. With switch armature $SW_3$ on its contact $cl^3$, adder Ad is inhibited but reinscription of the word portion stored in ferrite cores FC'' proceeds (without augmentation) via circuits *ro* and *wr*, irrespectively of the position of contact Tc. The buffer register Ml is inoperative this time.

Normally, however, the system of FIG. 2 is in its "auditing" position in which the network Det does not perform any useful function, the slight delay imparted by it to pulse AP being without significance. The simultaneous arrival of a word portion from circuit *ro* and of an auditing pulse at contact $ad^4$ renders the buffer register Ml receptive to this word portion so as to facilitate the ascertainment and/or the automatic recordal of the current balance of the account selected by switches $c^u$, $c^d$, $c^c$, $c^m$. If contact Tc is in its illustrated position, adder Ad remains inhibited and reinscription proceeds as before; in the alternate position of that contact, the energization of wire *lc* not only inhibits the adder but also blocks retransmission of the extracted amount to the memory cores $FC_2$ via writing circuit *wr*.

I claim:

1. In a communication system having a multiplicity of variously classified subscriber lines and facilities for making toll calls to be charged to the account of a calling subscriber of a predetermined classification, in combination:

central-office equipment responsive to an incoming call for establishing a toll connection between a calling line and a called line;

input circuitry energizable by said equipment to generate a code signal identifying the calling subscriber;

computer means including a memory with a multiplicity of storage sections each assigned to a respective subscriber and capable of storing an amount representing the current balance of the subscriber's account, said input circuitry extending to said memory for selectively addressing the storage section assigned to the subscriber identified by said code signal, said computer means further including read-out means for extracting the amount stored in any storage section upon the addressing of such section by said input circuitry, writing means connected to said read-out means for immediate reinscription of the extracted amount in the storage section so addressed, arithmetic means inserted between said read-out means and said writing means for augmenting said amount by one toll unit prior to reinscription, and retrieval means for determining the classification of a subscriber so identified;

normally inactive coupling means controlled by said retrieval means;

circuit means responsive to the establishment of a toll connection for applying to said input circuitry a number of counting pulses indicative of the number of toll units to be charged to the account of the calling subscriber, with resultant operation of said read-out, arithmetic and writing means by said code signal once per counting pulse to augment the amount stored in a section of said memory addressed by said input circuitry;

a source of interrogation pulses operable by said equipment in response to an incoming call for energizing said input circuitry with concurrent inhibition of said arithmetic means to activate said retrieval means; and recording means available for seizure by said coupling means upon ascertainment of said predetermined classification by said retrieval means for registering the identity of the calling subscriber together with the number of toll units charged to the latter's account, said recording means being connected to said input circuitry for directly receiving said code signal therefrom upon such seizure.

2. The combination defined in claim 1 wherein said circuit means comprises a first pulse generator and a second pulse generator, said equipment including a pulse distributor connected to both said pulse generators, said first pulse generator being actuatable by said equipment to transmit to said distributor a start pulse generating said interrogation pulse in the output of the distributor, said second pulse generator being actuatable by a toll signal on said called line to transmit to said distributor a train of rate pulses generating said counting pulses in the output of the distributor.

3. The combination defined in claim 2 wherein said equipment includes a line finder, said input circuitry comprising a set of code conductors connectable to said circuit means via a part of said line finder for selective energization thereby.

4. The combination defined in claim 3 wherein said retrieval means includes switch means for selectively energizing said code conductors independently of said line finder to address any one of said storage sections in response to an auditing pulse from said distributor, said retrieval means being connected to said read-out means for receiving the amount extracted from the section so addressed, said retrieval means further including command means for triggering said distributor to emit said auditing pulse in the absence of a counting pulse and control means for inhibiting said arithmetic means to prevent the augmentation of the amount to be reinscribed upon a triggering of said distributor by said command means.

5. The combination defined in claim 4 wherein said retrieval means includes selectively operable blocking means for deactivating said writing means to prevent reinscription of an amount transmitted to said retrieval means.

6. The combination defined in claim 2 wherein each storage section of said memory includes first storage means for registering said amount and second storage means for registering classification information relating to the respective subscriber, said retrieval means being connected to said second storage means via said read-out means, said circuit means including a blocking lead connected to said arithmetic means for inhibiting the augmentation of an amount to be reinscribed upon energization of said code conductors by said interrogation pulse, part of said writing means being coupled to said read-out means over a feedback connection independent of said arithmetic means for reinscribing extracted classification information on said second storage means.

7. The combination defined in claim 6 wherein said feedback connection includes blocking means for preventing reinscription of retrieved classification information, contact means selectively settable for feeding new classification information to said writing means, and command means for triggering said distributor to emit a timing pulse making said blocking means effective and energizing said contact means.

8. The combination defined in claim 2 wherein said recording means includes a registration unit and a buffer register inserted between said input circuitry and said registration unit, said buffer register having a first part for receiving said code signal from said input circuitry, a second part for receiving said rate pulse from said second pulse generator, and a third part for receiving an identification of a called subscriber from said equipment in response to destination signals emitted by the calling subscriber, said buffer register being provided with enabling means for conditioning said first part to receive said code signal upon the occurrence of a first rate pulse, said buffer register being further provided with cancellation means for clearing said third part without transmittal of its contents to said registration unit upon noncompletion of a call.

9. The combination defined in claim 8 wherein said equipment includes selector means responsive to a characteristic portion of said destination signals for establishing a toll connection recordable in said registration unit, further comprising discriminator means connected to receive at least part of said destination signals for maintaining said buffer register inoperative in the absence of said characteristic portion.

10. The combination defined in claim 8 wherein said buffer register includes transfer means linked with said distributor and triggerable by said equipment upon termination of a call and deactivation of said coupling means for summoning said distributor to direct a transmittal of the contents of said buffer register to said registration unit.

* * * * *